United States Patent

[11] 3,603,620

[72] Inventors Yoshihiro Nakata
1169 Iwase, Osawa-machi;
Testuo Kukuminato, 684 Chigusashinder, Osawa-machi, both of Kimitsu-gun, Chiba-ken, Japan
[21] Appl. No. 830,997
[22] Filed June 6, 1969
[45] Patented Sept. 7, 1971
[32] Priority June 24, 1968
[33] Japan
[31] 43/55915

[54] TUBE JOINT COUPLING
4 Claims, 6 Drawing Figs.
[52] U.S. Cl. ..................... 285/189, 285/238, 285/340
[51] Int. Cl. ..................... F16l 33/20
[50] Field of Search ..................... 285/340, 189, 238, 239, 304, 250, 40, 321; 85/36

[56] References Cited
UNITED STATES PATENTS
| | | | |
|---|---|---|---|
| 2,749,154 | 6/1956 | Smith | 285/321 X |
| 2,831,711 | 4/1958 | Leadbetter | 285/238 |

FOREIGN PATENTS
| | | | |
|---|---|---|---|
| 69,088 | 5/1949 | Denmark | 285/304 |
| 1,335,121 | 7/1963 | France | 285/340 |
| 606,013 | 6/1960 | Italy | 285/340 |
| 107,946 | 4/1964 | Netherlands | 285/238 |
| 376,326 | 5/1964 | Switzerland | 285/238 |

Primary Examiner—Thomas F. Callaghan
Attorney—Lawrence I. Field

ABSTRACT: A pipe joint wherein a clamp ring having a pair of inwardly bent claws having different lengths is securely held in position in a joint main body through a gasket by a securing member so that a soft or ductile pipe inserted is bent by the pair of claws, sealed by the gasket and securely held in position by the clamp ring and the gasket as the fluid pressure of the fluid flowing through the pipe expands it radially outwardly.

PATENTED SEP 7 1971 3,603,620
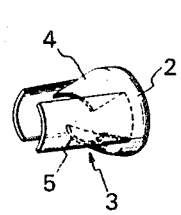
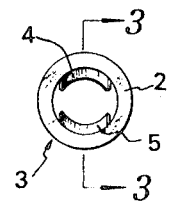
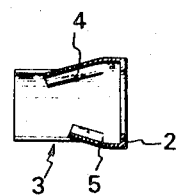
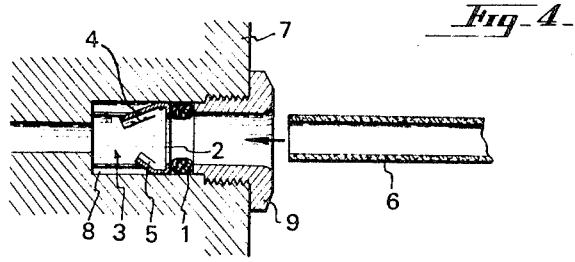
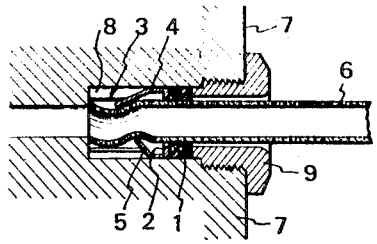
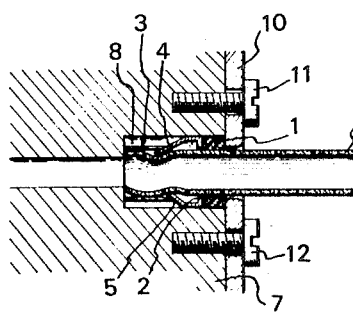
INVENTORS
Yoshihiro Nakata
Testuo Kukuminato
BY Lawrence J. Field
ATTORNEY

TUBE JOINT COUPLING

BACKGROUND OF THE INVENTION

The present invention relates to a pipe joint for joining a soft or ductile pipe or tube used in a fluid circuit.

In a conventional flared pipe joint for a soft or ductile pipe or tube, the leading end portion of the pipe is flared so as to form a flange for preventing the disconnection of the pipe and tightened sealingly by a nut. In a compression fitting or bite-type joint, a pipe to be joined is inserted into a tube or sleeve having beads formed its surface and is tightened by a nut so that the clamp tube or sleeve may deform so as to securely engage with the outer periphery of the pipe to be joined, thereby securely joining the pipe. However, in the flared pipe joints, more labor is required for assembly and the flared portion has a thin wall thickness so that the resistance to the pressure at this flared portion is inevitably reduced. In case of the compression-fitting and bite-type joints, it is difficult to determine whether a reliable joint is secured or not. That is, the clamp tube or sleeve that is deformed when the nut is tightened may fail to securely engage with the outer periphery of the pipe to be joined, thereby failing to provide complete sealing. On the other hand when the clamp tube or sleeve is deformed too much it may deform the pipe to be joined, thereby reducing its inner diameter and consequently the sectional area of the fluid path.

SUMMARY OF THE INVENTION

In brief, the present invention has for its object to provide a pipe joint incorporating therein a cylindrical clamp ring having a pair of inwardly bent claws formed in symmetrically opposed relation with each other in the cylindrical wall of the clamp ring by cutting the wall into suitable lengths with a suitable width.

The pipe joint according to the present invention is easy to manufacture and to assemble because the pipe or tube may be securely joined merely by inserting it into the pipe joint.

The above and other objects, features and advantages of the present invention will become more apparent from the following description of one preferred embodiment thereof taken in conjunction with the accompanying drawing.

BRIEF DESCRIPTION OF DRAWING

FIG. 1 is a perspective view of one embodiment of a clamp ring according to the present invention;

FIG. 2 is a rear view thereof;

FIG. 3 is a sectional view taken along the line 3—3 of FIG. 2;

FIG. 4 is a sectional view showing the assembly of the pipe joint according to the present invention;

FIG. 5 is a sectional view showing the pipe inserted in the pipe joint; and

FIG. 6 is a similar view to FIG. 5 with the exception that a modified securing means is used in the pipe joint.

DESCRIPTION OF THE PREFERRED EMBODIMENT

One preferred embodiment of the present invention will be described with reference to the accompanying drawings.

A cylindrical clamp ring generally designated by reference numeral 3 is provided with a flanged portion 2 for receiving a gasket 1 and a pair of symmetrically disposed claws 4 and 5 having different lengths. The pair of claws 4 and 5 may be formed by cutting the cylindrical portion or wall of the clamp ring 3 toward the flanged portion 2 with a suitable width but with different lengths and then bending them inwardly so that the distance between the pair of claws 4 and 5 is relatively smaller than the diameter of a pipe 6 to be joined. The gasket 1 pressed against the flanged portion 2 has an elliptical cross section and has a self-pressuretight joint function when compressed.

Into a joint hole 8 formed in a joint main body 7 is fitted the clamp ring 3 from its free end opposed to the flanged portion 2 thereof and is held in position by tightening a hollow nut 9 through the gasket 1. However as shown in FIG. 6, instead of the nut 9, a stop plate 10 may be used which is attached securely to the joint main body 7 by screws 11 and 12.

The pipe to be joined 6 is fitted through the nut 9 expanding the gasket 1 outwardly so that the pipe 6 may be completely sealed by the gasket 1. As the pipe 6 is advanced further inwardly, it abuts against the claw 5 first and is somewhat bent by the claw 5 and contacts with the claw 4 so that the pipe 6 is bent in the direction opposite to the direction of the pipe 6 bent by the claw 5. Thus, it will be seen that the leading portion of the pipe 6 is curved in the shape of S and abuts finally against the end face of the main body 7, completing the joint.

In the joint of the present invention having the construction as described hereinabove, the pair of claws 4 and 5 tend to catch the pipe 6 while the pipe 6 that is bent in the form of S by the pair of claws 4 and 5 is caught by the pair of claws 4 and 5 when the pipe 6 is pulled back straightly so that the pipe 6 may be securely held in joined position. Furthermore, when the fluid flows through the pipe 6, the fluid will tend to expand the pipe 6 radially outwardly so that the pair of claws 4 and 5 may catch or grip the pipe 6 with increased force. Vibrations of the pipe 6 may be absorbed by the gasket 1 so that vibrations will not be transmitted to the pair of claws 4 and 5 whereby the pipe 6 may be well prevented from being pulled out of the joint by vibrations. The pipe 6 may be detached readily by removing the nut 9 while the joint may be accomplished only by inserting the pipe 6 into the joint body 7 so that the piping work can be accomplished within a shorter working time and many pipes may be installed in a restricted small space.

The present invention has been so far described with particular reference to the preferred embodiment thereof, but it will be understood that variations and modifications can be effected without departing the true spirit of the present invention as described hereinabove and as defined in the appended claims.

1. A pipe joint comprising:
    a joint main body having a bore extending lengthwise, axially of said body and a joint hole counterbore in one end of said body, there being a radial shoulder at the inner end of said counterbore;
    a clamp ring and a gasket fitted into said joint hole in the order named, said clamp ring having a cylindrical configuration and is provided with a pair of inwardly bent claws in symmetrically opposed relation with each other, said pair of claws being cut in the longitudinal direction from the cylindrical wall of said clamp ring, said pair of claws having different lengths whereby the forward portions of said claws are axially displaced from one another and face said radial shoulder; and
    a securing member adapted to hold said clamp ring and said gasket securely in position within said joint hole, whereby a pipe that is only inserted into said joint hole through said clamp ring and said gasket may be securely joined to said joint body by the clamping action of said clamp ring and the self-sealing action of said gasket, said radial shoulder acting as a stop for the forward portion of said clamp ring.

2. A pipe joint according to claim 1 wherein said gasket is a ring having an elliptical cross section and being adapted to effect sealing when compressed by said securing member.

3. A pipe joint according to claim 1 wherein said securing member is a nut.

4. A pipe joint according to claim 1 wherein said securing member is
    a stop plate and
    a plurality of screws.